D. FISCHMANN.
APPARATUS FOR MEASURING AND INDICATING THE TANGENTIAL PRESSURE OR THE OUTPUT OF PISTON ENGINES.
APPLICATION FILED JULY 7, 1921.

Patented May 16, 1922.

Inventor:
David Fischmann (I—I)

D. FISCHMANN.
APPARATUS FOR MEASURING AND INDICATING THE TANGENTIAL PRESSURE OR THE OUTPUT OF PISTON ENGINES.
APPLICATION FILED JULY 7, 1921.

1,416,456.

Patented May 16, 1922.

Inventor:
David Fischmann
by Lotka, Kehlenbeck & Mathé
Attorneys.

UNITED STATES PATENT OFFICE.

DAVID FISCHMANN, OF BERLIN, GERMANY.

APPARATUS FOR MEASURING AND INDICATING THE TANGENTIAL PRESSURE OR THE OUTPUT OF PISTON ENGINES.

1,416,456.  Specification of Letters Patent.  Patented May 16, 1922.

Application filed July 7, 1921. Serial No. 483,078.

*To all whom it may concern:*

Be it known that I, DAVID FISCHMANN, a citizen of the Free State of Ukraine, residing at Berlin, Germany, have invented certain new and useful Improvements in Apparatus for Measuring and Indicating the Tangential Pressure or the Output of Piston Engines, (for which I have applied for a patent in Germany January 30, 1920, and in Spain February 28, 1920,) of which the following is a specification.

The continuous measuring of the output of the power engines at work is one of the most important duties of the work's manager. The development of the measuring methods and devices has not yet conducted to a final result for the piston engines which are the principal representatives of the so-called purely mechanical drives, in contradistinction to the electric engines, as hitherto no apparatus has been constructed by means of which the actual output of the engine could be read in a simple manner directly from a graduation, as can be done for electric engines.

The known methods for ascertaining the output of piston engines, which are based upon the use of the indicator, sometimes in combination with the recently constructed output counters, which measure and sum up the indicator diagram, cannot be considered as forming a final solution of the problem owing to the complicated manipulation and to the calculations which are necessary to obtain every value of measure.

This gap is filled by the device which will be hereinafter described and which is based upon a novel measuring method.

In order that the invention may be clearly understood I shall describe the same with reference to the form of construction shown by way of example in the accompanying drawing, wherein:—

Fig. 1 illustrates diagrammatically the principle of the measuring method.

Fig. 1ª is a diagram of a slightly different form of construction.

The invention is based upon the following considerations:

The tangential pressure at the crank circle of a piston engine is, with a constant number of revolutions, proportional to the actual output of the engine. The determination of these pressures, by which therefore the measuring of the output would be obtained, can however be carried out practically only very seldom, owing to the wide variations in the pressures in question. This difficulty is avoided according to the invention, in the following manner:

The tangential pressure, neglecting in the first instance the limited length of the connecting rod, is given by the relation $T = P \sin \alpha$. $T$ is herein the tangential pressure, $P$ the pressure of the piston and $\alpha$ the actual angle of phase of the crank. The tangential pressure varies therefore in the same manner as the actual pressure of the position in proportion to the sine of the angle of phase of the crank.

Figure 1:
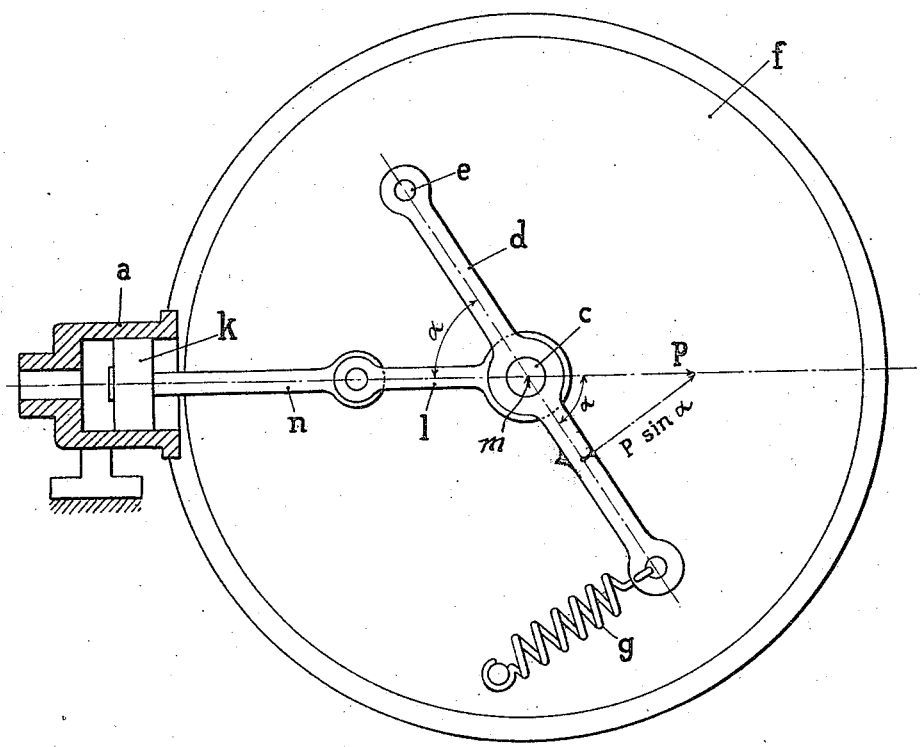
Figure 1:
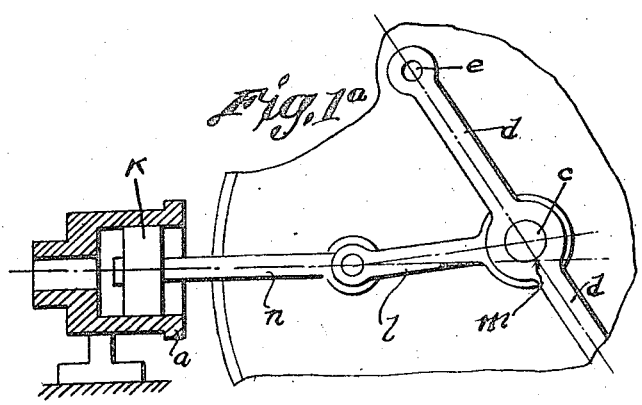

The invention comprises a disk $f$ (see Fig. 1) which revolves synchronously with the engine to be measured, upon which disk an oscillating lever $d$ is arranged radially to said disk so that it can swing around an axle $e$ which is situated out of the center. The pressure of a small piston $k$, which, after the manner of an indicator piston is exposed to the cylinder pressure of the piston engine, is transferred to the lever $d$ by means of the piston rod $n$ and of the link $l$ having a pivotal connection $c$ with said lever $d$. When the disk $f$ is revolved about its axis $m$ synchronously with the engine so that the direction of the longitudinal axis of the oscillating lever $d$ forms always the same angle of phase $\alpha$ with the direction of the piston rod $n$, as the engine crank with its piston rod, a torsioning force is transmitted to the lever $d$, in accordance with the resolution of forces indicated by Fig. 1, which is proportional to $P \sin \alpha$. The measuring of this torsional force can therefore serve for the determination of the tangential pressure and consequently of the output of the engine. The spring G in Fig. 1 indicates the measuring device diagrammatically.

By the link $l$ the liberty of movement of the oscillating lever $d$ is ensured in case the measuring organ should yield. A similar action of forces upon the lever $d$ can evidently be produced when the disk which carries the lever is fixed and the piston $k$ revolves around the entire axis of the disk $f$, after the manner known for example in aeromotors with revolving cylinders. The piston of the device described has the advantage over an indicator piston that it remains essentially at rest and executes only slight oscillations when the lever $d$ is brought out of the strictly radial position upon the disk $f$ by the pressure of the piston. In the construction illustrated by Figs. 1 and 2 to 5 inclusive, the length of the link or lever $d$, between its pivots $c$ and $e$, is exactly equal to the radial distance of the point $e$ from the center or shaft $m$ of the disk $f$; the axes of $c$ and of $m$ may therefore be in line with other, or coincide, as in Figs. 1 and 2.

If the influence of the limited length of the connecting rod of the engine has to be taken into account, this can be easily done by locating the axis of attack $c$ of the link $l$ upon the lever $d$ somewhat eccentrically to the disk $f$, the length of the link $l$ being adapted to this eccentricity. In this case, the distance between the centers of $e$ and $c$ will, as shown in the diagram Fig. 1ª, be shorter than the distance between the axes of $e$ and $m$.

The measuring of the moment or torsion acting upon the lever $d$ can be effected in various manners. All the possibilities given for dynamometric measurings can be used. The indications can be recorded in the well known manner by registering devices. If the indication of the tangential pressure is automatically controlled in a convenient manner by the actual revolving speed of the engine so that it varies in proportion to the same, an indication of output can thus be realized even with a varying revolving speed of the engine.

Figure 2:
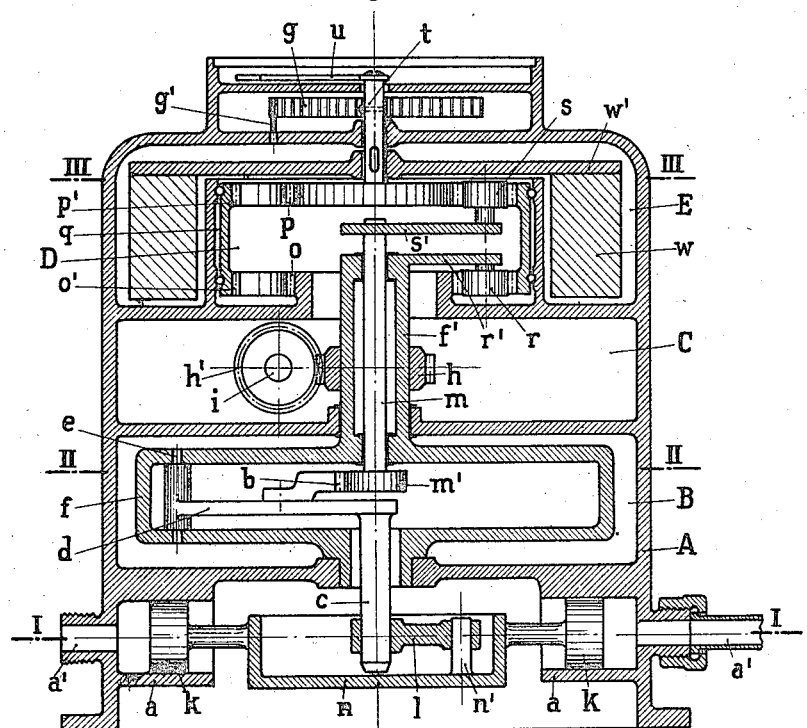
Fig. 2 shows in cross section a measuring device for the application of the novel measuring method.
Figure 3:
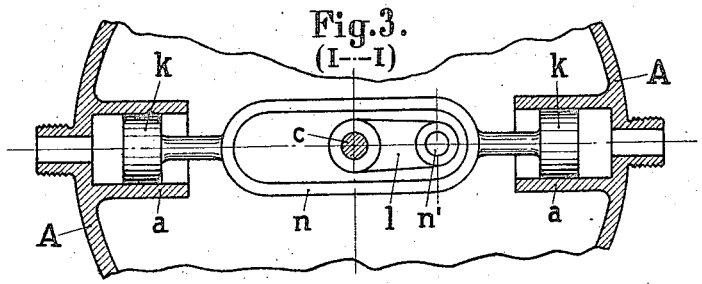
Fig. 3 shows the middle part of a section on line I—I of Fig. 2.
Figure 4:
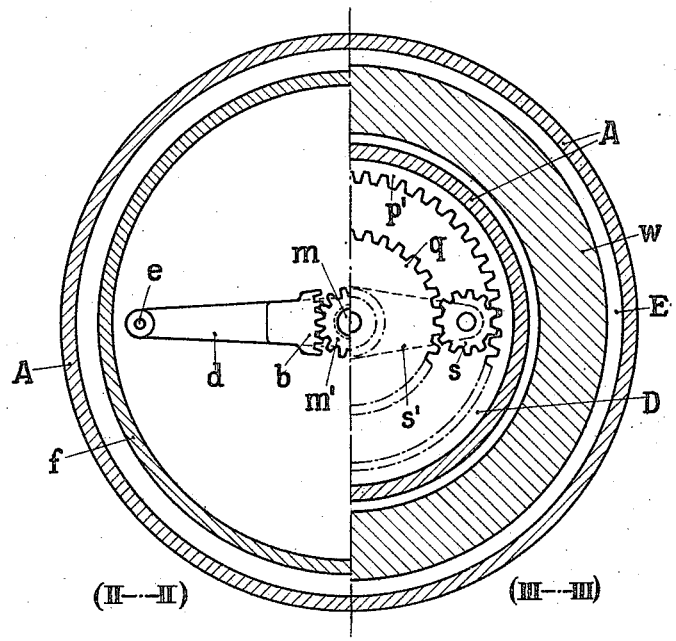
Fig. 4 shows at the left hand side a section on line II—II and at the right hand side a section on line III—III of Fig. 2.
Figure 5:
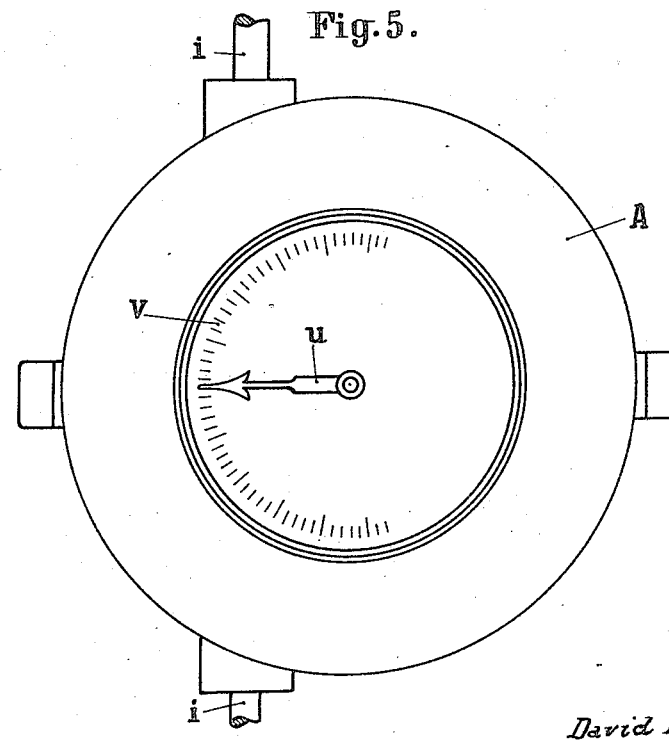
Fig. 5 is a top view of the apparatus.

Figures 2 and 5 show in which manner a measuring apparatus for a double acting piston engine can be constructed. In the lower part of the casing A two pistons $k$ are mounted diametrically opposite one another in two small cylinders $a$. The spaces behind these pistons are connected by tubular connections $a'$ each with one side of the cylinder of the power engine so that the pressure from one side of the cylinder acts upon the one piston, the pressure from the other side of the cylinder acting upon the other piston. The pistons $k$ are rigidly connected with one another by a bridge $n$ so that the resultant pressure of both cylinder sides is transmitted to a pin $n'$ mounted upon said bridge $n$ and from there by means of the link $l$ upon the axle $c$ and thus upon the oscillating lever $d$ which is arranged above the cylinders $a$ in the space B of the casing. In this manner both sides of the cylinder are indicated simultaneously by means of one apparatus in contradistinction of what is the case in an indicator. The oscillating lever $d$ is located in the hollow disk $f$. This disk is revolubly mounted in the outer casing of the apparatus by means of hub-like extensions and it is revolved in synchronism with the engine through the intermediary of a pair of helical wheels $h$, $h'$ from the driving shaft $i$. The drive is effected by the helical wheel $h$ being keyed upon the hub $f'$ of disk $f$. The driving mechanism is located in the chamber C of the casing.

The moment of torsion transmitted to the oscillating lever $d$ is then transmitted by a toothed segment $b$ mounted upon the lever and by a pinion $m'$ in engagement with said segment and secured upon a shaft $m$ which is revolubly mounted in the revolving disk $f$. The shaft $m$ and the disk $f$ revolve at the same speed, and a relative displacement of these parts takes place only when a turning moment is transmitted from the piston $k$, as stated above.

In order to make this moment of torsion transmitted to a revolving part visible from the outside, a transmission gear is used which is located in the upper and inner chamber D of the casing A. In the form of construction shown by way of example this transmission gear is constructed as follows: It consists of the spur wheels $o$ and $p$ of equal size and having teeth upon the outer circumference and of the internal gear rims $o'$, $p'$ of equal size and having teeth upon the inner circumference, which internal gears enclose said spur wheels, and further of two spur wheels $r$ and $s$ of equal size in mesh with the spur wheels and internal gear rims $o$, $o'$ and $p$, $p'$ respectively. The two internal gear rims $o'$, $p'$ are mounted upon a bushing $q$ which is revolubly mounted in the partition of the casing which closes a side of the inner chamber D. The spur wheel $o$ is keyed upon the casing of the apparatus, the other spur wheel $p$ being constructed as a toothed wheel and mounted upon the end of a shaft $t$ which is mounted in the upper wall of the casing so that it can freely rotate. Of the two spur wheels $r$ and $s$ which roll upon the internal gear rims $o$, $o'$ and $p$, $p'$ the first one $r$ is connected by means of a lever $r'$ with the hub $f'$ of the revolving disk $f$, the second spur wheel $s$ being connected by means of lever $s'$ with the shaft $m$ revolubly mounted in hub $f'$.

From this arrangement of the transmission gear results a transmission of the moment of torsion, which acts upon the shaft $m$, to the shaft $t$, which, in opposition to the shaft $m$ does not execute a relative displacement with regard to the revolving disk $f$, which cannot be observed, but a displacement relatively to the fixed outer casing A in which it is mounted. The moment of torsion transmitted to shaft $t$ can therefore be taken up by a spring $g$, attached with one end to a stud $g'$ fixed in the casing A and with the other end to the shaft $t$. The moment of torsion taken up by spring $g$ is indicated by a hand $u$ connected with shaft $t$ upon a graduation $v$ provided on the casing A.

The transmission gear can also be constructed in any other convenient manner provided only that it attains the purpose aimed at. A transmission of convenient construction could further be interposed between the shaft $t$ and the hand $u$ in order to increase the deflection of the hand.

The importance of the transmission gear described does not only consist in the translation of the displacement of lever $d$ with regard to the revolving casing $f$ into a corresponding displacement of shaft $t$ which can be observed directly, but essentially in this that the ratio of transmission between the displacement of lever $d$ and shaft $t$ can be multiplied at will by selecting correspondingly the dimensions of this gear and of the gear $m'$. This is however of special importance for the practical application of the measuring method for the following reasons.

The novel arrangement is based upon the measuring of the tangential pressure transmitted to lever $d$. The measuring is effected by the transmission of the pressure upon a measuring organ (spring $g$), the amplitude of distention of this spring indicating the value of the pressure. The distention of the measuring organ $g$ provokes however an oscillation of the lever $d$ with regard to disk $f$ and consequently with regard to the crank of the engine in the same sense, whereby the equality of phase between the lever $d$ and the crank of the engine, upon which the measuring method is based, is suppressed.

Two possibilities are given to avoid this difficulty. The one consists in this that before every reading off, the lever $d$ is displaced, for example by displacement of the end of spring $g$ which is attached in the casing A, until equality of phase between lever $d$ and the engine crank is indicated, e. g., with the aid of a synchronizing mechanism of convenient construction. Only then the reading can take place. Herefrom results however the inconvenience that, before every reading, an adjusting or a synchronization of the apparatus has to be effected, whereby the usefulness of the apparatus is considerably impaired as in general only such measuring devices are adapted for general use in which the measuring is limited to the reading off of the value measured from a graduation of the apparatus without any further manipulation. It may be pointed out that for engines with suddenly varying load the synchronizing, which ought to be effected very rapidly, would become impossible under certain conditions, so that the apparatus could not be used.

The other possibility, which is made use of by the present invention, consists in discarding the absolute equality of phase between lever $d$ and engine crank at every load, and by admitting for the lever $d$ a certain variation from the exactly radial position upon disk $f$, depending on the charge, which is however limited to a few degrees only so that the error of measuring produced by this variation from the absolute equality of phase between lever $d$ and engine crank remains so small that it can be neglected. The construction of the apparatus according to the last mentioned possibility is given without difficulty by the utilization of the above described transmission gear which permits of a great transmission, as with a sufficiently great deflection of the spring $g$ the angle of oscillation of lever $d$ can be kept infinitely small by a convenient dimensioning of the transmission. The utilization of this gear permits further another expedient which is very important for the practical construction of the apparatus.

According to the intermittent character of the tangential pressures of piston engines there are in general transmitted to the lever $d$ at one revolution of the engine twice pressures which vary from zero to a maximum value. The apparatus is however not designed to indicate the actual momentary value of the pressure which, in consequence of the rapid variation of pressure would not be readable, but the temporary average value of the same. Such an average value is obtained directly by the insertion of a mass of inertia between the organ which takes up the intermittent pressure and the measuring organ or the indicating device, said centrifugal mass transforming by its inertia, the intermittent pressure into a pressure which corresponds to the tangential average value. The centrifugal mass acts in this case in a manner analogous to the fly wheel of a power engine.

In the apparatus described such a mass $w$ is mounted in the annular space E of casing A and rigidly connected with shaft $t$ by means of a disk $w'$. This arrangement presents, in comparison with the other possibilities of the direct connection of the mass with the lever $d$ or with the shaft $m$, the advantage that, first a moment of torsion is transmitted upon the mass which is diminished in proportion to the total transmission inserted, whereby the small dimensions of the mass of inertia are rendered possible which are necessary for the practical execution of the device, and that, secondly the mass of inertia does no longer revolve—owing to the action of the transmission gear—together with the revolving parts of the apparatus, but besides the slight oscillations caused by the irregularity of the pressure, merely executes displacements which correspond to the modified average pressure relatively to the stationary outer casing A.

I claim:—

1. An apparatus for measuring and indicating the tangential pressure of piston engines comprising in combination a casing, an organ subjected to the cylinder pressure of the engine, a rotary disk and means for revolving it synchronously with the engine, a lever mounted upon said disk in the direction of a diameter of the same, the direction of the axis of said lever forming with the direction of the axis of said organ an angle which is always approximately equal to the phase angle of the engine crank, a shaft mounted in said casing and a transmission gear for translating the relative displacement of said lever which takes up the proportional moment of torsion of the engine, with regard to said revolving disk, into a proportional relative displacement of said shaft with regard to the casing.

2. An apparatus for measuring and indicating the tangential pressure of piston engines comprising in combination with a casing, an organ subjected to the cylinder pressure of the engine, a rotary disk and means for revolving it synchronously with the engine to be measured, an oscillating lever mounted upon said disk so that it revolves with the same, means for transmitting the pressure from said organ to said lever so that the direction of the axis of said lever forms with the direction of the axis of said organ an angle which is approximately equal to the phase of angle of the engine crank a phase difference between said engine crank and said lever being admitted, a shaft mounted in said casing and an adjustable transmision gear for translating the relative displacement of said lever with regard to said disk into a proportional relative displacement of said shaft with regard to the casing, said transmission reducing the phase difference so that the error of measuring resulting from said phase difference can be neglected.

3. An apparatus for measuring and indicating the tangential pressure of piston engines comprising in combination with a casing, an organ subjected to the cylinder pressure of the engine, a rotary disk and means for revolving it synchronously with the engine to be measured, an oscillating lever mounted upon said disk so that it revolves with the same, a shaft operated by said lever, means for transmitting the pressure from said organ to said lever so that the direction of the axis of said lever forms with the direction of the axis of said organ always an angle which is approximately equal to the phase of angle of the engine crank, an indicator shaft mounted in said casing, a spur wheel fixed to said casing, a spur wheel rigidly connected to said indicator shaft, two internal gear rims rigidly connected the one with the other revolubly mounted in the casing and surrounding said spur gears, an intermediary toothed wheel carried by said revolving disk and an intermediary toothed wheel carried by said shaft operated by the oscillating lever, said toothed wheels coupling the internal gear rims with the spur gears.

4. An apparatus for measuring and indicating the tangential pressure of piston engines comprising in combination with a casing, an organ subjected to the cylinder pressure of the engine, a rotary disk and means for revolving it synchronously with the engine to be measured, an oscillating lever mounted upon said disk so that it revolves with the same, a shaft operated by said lever, means for transmitting the pressure from said organ to said lever so that the direction of the axis of said lever forms with the direction of the axis of said organ always an angle which is approximately equal to the phase of angle of the engine crank, an indicator shaft mounted in said casing, a spur gear fixed to said casing, a spur gear rigidly connected to said indicator shaft, two internal gear rims rigidly connected the one with the other revolubly mounted in the casing and surrounding said spur gears, an intermediary toothed wheel carried by said revolving disk and an intermediary toothed wheel carried by said shaft operated by the oscillating lever, said toothed wheels coupling the internal gear rims with the spur gears, and a mass of inertia mounted on the indicator shaft behind said transmission gear between the oscillating lever and the indicator shaft.

5. An apparatus for measuring and indicating the tangential pressures of piston engines comprising in combination with a casing, an organ subjected to the pressure of one side of the engine cylinder, a similar organ subjected to the pressure of the other side of the engine cylinder, means for rigidly connecting said organs, a rotary disk and means for revolving it synchronously with the engine, an oscillating lever upon said disk, means for transmitting the resulting pressure of the two sides of the engine cylinder from said organs to said oscillating lever, an indicating device, and means for transmitting the relative displacement of said oscillating lever with regard to said revolving disk to said indicating device.

6. Apparatus of the character described, comprising a member exposed to pressure, a rotary member and means for revolving it synchronously with the mechanism in connection with which the apparatus is used, a lever fulcrumed about an axis eccentric to the axis about which said rotary member revolves, and adapted to assume a substantially radial position relatively to said axis of revolution, an operative connection between said member exposed to pressure and said lever, and an elastic connection between said rotary member and said lever, the direction of the lever corresponding to the direction of the crank of the mechanism in connection with which the apparatus is used.

7. Apparatus of the character described, comprising a member movable in response to pressure changes, another member mounted to rotate synchronously with the mechanism in connection with which the apparatus is used, a lever fulcrumed about an axis parallel to the axis of rotation of said second-named member, but eccentric thereto, an operative connection between said lever and said member movable in response to pressure changes, and an elastic connection between said rotary member and said lever.

8. Apparatus of the character described, comprising a member movable in response to changes of pressure, a rotary member and means for revolving it synchronously with the mechanism in connection with which the apparatus is used, a lever fulcrumed about an axis eccentric to the axis about which said rotary member revolves, said lever being adapted to assume a substantially radial position relatively to said axis of revolution, an operative connection between said lever and said member movable in response to pressure changes, said connection being pivotally linked to the lever at a point situated at the same distance from the said lever fulcrum as said axis of revolution, and an elastic connection between said rotary member and said lever.

In testimony whereof I affix my signature in presence of two witnesses.

DAVID FISCHMANN.

Witnesses:
REINHARD WOHLFORTH,
ROBERT KLOH.